US011657984B2

(12) United States Patent
Lee et al.

(10) Patent No.: US 11,657,984 B2
(45) Date of Patent: May 23, 2023

(54) SEPARATOR FOR ELECTROCHEMICAL DEVICE, METHOD FOR MANUFACTURING SAME, AND ELECTROCHEMICAL DEVICE COMPRISING SAME

(71) Applicant: LG Chem, Ltd., Seoul (KR)

(72) Inventors: Joo-Sung Lee, Daejeon (KR); A-Young Lee, Daejeon (KR)

(73) Assignee: LG Chem, Ltd.

( * ) Notice: Subject to any disclaimer, the term of this patent is extended or adjusted under 35 U.S.C. 154(b) by 480 days.

(21) Appl. No.: 16/756,706

(22) PCT Filed: Jun. 7, 2019

(86) PCT No.: PCT/KR2019/006897
§ 371 (c)(1),
(2) Date: Apr. 16, 2020

(87) PCT Pub. No.: WO2019/245202
PCT Pub. Date: Dec. 26, 2019

(65) Prior Publication Data
US 2020/0259149 A1  Aug. 13, 2020

(30) Foreign Application Priority Data
Jun. 20, 2018  (KR) .................. 10-2018-0071063

(51) Int. Cl.
| | |
|---|---|
| *H01G 11/52* | (2013.01) |
| *H01G 11/84* | (2013.01) |
| *H01M 10/0525* | (2010.01) |
| *H01M 50/403* | (2021.01) |
| *H01M 50/446* | (2021.01) |
| *H01M 50/417* | (2021.01) |
| *H01M 50/426* | (2021.01) |
| *H01M 50/443* | (2021.01) |
| *H01M 50/489* | (2021.01) |
| *H01M 50/457* | (2021.01) |

(52) U.S. Cl.
CPC ............ *H01G 11/52* (2013.01); *H01G 11/84* (2013.01); *H01M 10/0525* (2013.01); *H01M 50/403* (2021.01); *H01M 50/417* (2021.01); *H01M 50/426* (2021.01); *H01M 50/443* (2021.01); *H01M 50/446* (2021.01); *H01M 50/457* (2021.01); *H01M 50/489* (2021.01)

(58) Field of Classification Search
CPC ............ H01M 50/449; H01M 50/403; H01M 50/446; H01M 50/411; H01M 10/0525; H01M 50/489; H01M 50/417; H01M 50/426; H01M 50/457; H01M 50/443; H01G 11/52; H01G 11/84
USPC .................. 361/502, 503, 512, 511; 429/144
See application file for complete search history.

(56) References Cited

U.S. PATENT DOCUMENTS

| | | | |
|---|---|---|---|
| 7,008,724 B2* | 3/2006 | Cochran | ........... H01M 10/0565 429/212 |
| 2009/0170005 A1 | 7/2009 | Kimishima et al. | |
| 2011/0045338 A1 | 2/2011 | Bae et al. | |
| 2012/0115036 A1 | 5/2012 | Lee et al. | |
| 2014/0038025 A1 | 2/2014 | Ha et al. | |
| 2014/0248525 A1 | 9/2014 | Iwai et al. | |
| 2014/0255754 A1 | 9/2014 | Nishikawa et al. | |
| 2014/0308567 A1 | 10/2014 | Nishikawa et al. | |
| 2016/0099483 A1 | 4/2016 | Lee et al. | |
| 2017/0179456 A1 | 6/2017 | Kim et al. | |
| 2018/0034025 A1* | 2/2018 | Lee | ..................... H01M 50/451 |
| 2018/0190957 A1 | 7/2018 | Honda et al. | |
| 2018/0371228 A1 | 12/2018 | Yasuda et al. | |
| 2019/0013504 A1 | 1/2019 | Choi et al. | |

FOREIGN PATENT DOCUMENTS

| | | |
|---|---|---|
| CN | 102532758 A | 7/2012 |
| CN | 103890998 A | 6/2014 |
| EP | 3376561 A1 | 9/2018 |
| JP | 2012256505 A | 12/2012 |
| JP | 2016072117 A | 5/2016 |
| JP | 6143992 B1 | 6/2017 |
| JP | 2017183212 A | 10/2017 |
| KR | 20080072650 A | 8/2008 |
| KR | 20090095478 A | 9/2009 |
| KR | 20110097715 A | 8/2011 |
| KR | 20140016715 A | 2/2014 |
| KR | 20140017762 A | 2/2014 |

(Continued)

OTHER PUBLICATIONS

Search Report dated Dec. 17, 2021 from Office Action for Chinese Application No. 20198005089.1 dated Dec. 28, 2021. 2 pgs.
International Search Report for PCT/KR2019/006897 dated Sep. 19, 2019; 2 pages.
Extended European Search Report including Written Opinion for Application No. 19821866.1 dated Mar. 17, 2021, 10 pages.
Vyas, Manoj Kumar et al, "Role of organic/inorganic salts and nanofillers in polymer nanocomposites: enhanced conduction, rheological, and thermal properties", Journal of Materials Science, published online Dec. 2017, pp. 4987-5003, vol. 53, No. 7, Springer.

*Primary Examiner* — Arun Ramaswamy
(74) *Attorney, Agent, or Firm* — Lerner David LLP

(57) ABSTRACT

A separator for an electrochemical device is provided. The separator includes a porous polymer substrate, and a porous coating layer formed on at least one surface of the porous polymer substrate, wherein the porous coating layer includes inorganic particles, a first polyvinylidene fluoride copolymer and a second polyvinylidene fluoride copolymer. A method for manufacturing the separator, and an electrochemical device including the same are also provided. It is possible to provide a separator with excellent adhesion between the porous polymer substrate and the porous coating layer and excellent adhesion to an electrode, and an electrochemical device including the same.

15 Claims, No Drawings

(56) References Cited

FOREIGN PATENT DOCUMENTS

| | | |
|---|---|---|
| KR | 20140060800 A | 5/2014 |
| KR | 101455043 B1 | 10/2014 |
| KR | 20160040019 A | 4/2016 |
| KR | 20160077529 A | 7/2016 |
| KR | 20170022042 A | 3/2017 |
| KR | 20170037556 A | 4/2017 |
| KR | 20170074535 A | 6/2017 |
| KR | 20170085825 A | 7/2017 |
| KR | 20180022668 A | 3/2018 |
| WO | 9838687 A1 | 9/1998 |
| WO | 2013058368 A1 | 4/2013 |
| WO | 2013058370 A1 | 4/2013 |
| WO | 2013058371 A1 | 4/2013 |
| WO | 2017082258 A1 | 5/2017 |
| WO | 2017155106 A1 | 9/2017 |

\* cited by examiner

SEPARATOR FOR ELECTROCHEMICAL DEVICE, METHOD FOR MANUFACTURING SAME, AND ELECTROCHEMICAL DEVICE COMPRISING SAME

CROSS-REFERENCE TO RELATED APPLICATIONS

The present application is a national phase entry under 35 U.S.C. § 371 of International Application No PCT/KR2019/006897 filed Jun. 7, 2019 which claims priority from Korean Patent Application No. 10-2018-0071063 filed on Jun. 20, 2018, the disclosures of which are incorporated herein by reference in their entirety

TECHNICAL FIELD

The present disclosure relates to a separator for an electrochemical device, a method for manufacturing the same and an electrochemical device including the same. Particularly, the present disclosure relates to a separator which has excellent adhesion between a porous polymer substrate and a porous coating layer and excellent adhesion to an electrode, a method for manufacturing the same, and an electrochemical device including the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a positive electrode and a negative electrode.

To solve the above-mentioned safety problem of an electrochemical device, there has been suggested a separator including a porous coating layer formed by coating a mixture of an excessive amount of inorganic particles with a binder polymer to at least one surface of a porous polymer substrate having a plurality of pores.

After coating such a porous coating layer on a porous polymer substrate, pores are formed on the porous coating layer through phase separation based on selection of a solvent/non-solvent. Herein, when the binder polymer contained in the slurry for forming a porous coating layer shows a high phase separation kinetic rate, pores having a large diameter are formed on the surface of the porous coating layer, thereby causing a problem of degradation of adhesion between the porous polymer substrate and the porous polymer coating layer.

On the contrary, when the binder polymer shows a low phase separation kinetic rate, most binder polymers are positioned at the interface of the porous coating layer facing the porous polymer substrate, thereby forming a porous coating layer having no pores or having pores having a small pore size, and causing a problem of degradation of adhesion between the separator and an electrode.

DISCLOSURE

Technical Problem

The present disclosure is designed to solve the problems of the related art, and therefore the present disclosure is directed to providing a separator for an electrochemical device which has excellent adhesion between a porous polymer substrate and a porous coating layer forming the separator, while showing excellent adhesion between an electrode and the separator.

The present disclosure is also directed to providing a separator which shows a high oxidation potential of a porous coating layer facing a positive electrode.

In addition, the present disclosure is directed to providing a method for manufacturing the separator and an electrochemical device including the separator.

It will be easily understood that these and other objects and advantages of the present disclosure may be realized by the means shown in the appended claims and combinations thereof.

Technical Solution

In one aspect of the present disclosure, there is provided a separator for an electrochemical device according to any one of the following embodiments.

According to the first embodiment, there is provided a separator for an electrochemical device, including:
a porous polymer substrate; and
a porous coating layer formed on at least one surface of the porous polymer substrate,
wherein the porous coating layer includes inorganic particles, a first polyvinylidene fluoride copolymer and a second polyvinylidene fluoride copolymer,
$G_1'$ (storage modulus) and $G_1''$ (loss modulus) of the first polyvinylidene fluoride copolymer undergo a reverse transition, and
$G_2'$ (storage modulus) and $G_2''$ (loss modulus) of the second polyvinylidene fluoride copolymer undergo no reverse transition.

According to the second embodiment, there is provided the separator for an electrochemical device as defined in the first embodiment, wherein $G_1'$ and $G_1''$ of the first polyvinylidene fluoride copolymer undergo a reverse transition in a region of frequency of 0.5 Hz or less under the condition of a solution containing the first polyvinylidene fluoride copolymer at a solid content of 5 wt % in a solvent including N-methyl pyrrolidone and water mixed at a weight ratio of 90:10.

According to the third embodiment, there is provided the separator for an electrochemical device as defined in the first or the second embodiment, wherein the first polyvinylidene fluoride copolymer has a weight average molecular weight larger than the weight average molecular weight of the second polyvinylidene fluoride copolymer.

According to the fourth embodiment, there is provided the separator for an electrochemical device as defined in any one of the first to the third embodiments, wherein the first polyvinylidene fluoride copolymer has a weight average molecular weight of 400,000-1,500,000, and the second polyvinylidene fluoride copolymer has a weight average molecular weight of 50,000-350,000; and the weight ratio of the first polyvinylidene fluoride copolymer to the second polyvinylidene fluoride copolymer is 90:10-40:60.

According to the fifth embodiment, there is provided the separator for an electrochemical device as defined in any one of the first to the fourth embodiments, wherein each of the first polyvinylidene fluoride copolymer and the second polyvinylidene fluoride copolymer independently includes a vinylidene fluoride-derived repeating unit; and at least one additional repeating unit derived from hexafluoropropylene, trichloroethylene, trifluoroethylene, tetrachloroethylene, tetrafluoroethylene or chlorotrifluoroethylene.

According to the sixth embodiment, there is provided the separator for an electrochemical device as defined in the fifth embodiment, wherein the weight average molecular weight of the additional repeating unit of the second polyvinylidene fluoride copolymer is equal to or smaller than the weight average molecular weight of the additional repeating unit of the first polyvinylidene fluoride copolymer.

According to the seventh embodiment, there is provided the separator for an electrochemical device as defined in the fifth embodiment, wherein the weight ratio of the vinylidene fluoride-derived repeating unit to the additional repeating unit in the first polyvinylidene fluoride copolymer is 99:1-90:10, and the weight ratio of the vinylidene fluoride-derived repeating unit to the additional repeating unit in the second polyvinylidene fluoride copolymer is 89:11-70:30.

According to the eighth embodiment, there is provided the separator for an electrochemical device as defined in any one of the first to the seventh embodiments, wherein the first polyvinylidene fluoride copolymer has an oxidation potential of 5.0V or higher based on Li.

In another aspect of the present disclosure, there is also provided a method for manufacturing a separator for an electrochemical device according to any one of the following embodiments.

According to the ninth embodiment, there is provided a method for manufacturing a separator for an electrochemical device, including the steps of:

(S1) preparing slurry containing a solvent, inorganic particles, a first polyvinylidene fluoride copolymer and a second polyvinylidene fluoride copolymer;

(S2) applying the slurry onto at least one surface of a porous polymer substrate;

(S3) dipping the product of (S2) in a non-solvent to cause phase separation; and (S4) drying the product of (S3) to form a porous coating layer on at least one surface of the porous polymer substrate, wherein the porous coating layer includes inorganic particles, a first polyvinylidene fluoride copolymer and a second polyvinylidene fluoride copolymer, $G_1'$ (storage modulus) and $G_1''$ (loss modulus) of the first polyvinylidene fluoride copolymer undergo a reverse transition, and $G_2'$ (storage modulus) and $G_2''$ (loss modulus) of the second polyvinylidene fluoride copolymer undergo no reverse transition.

According to the tenth embodiment, there is provided the method for manufacturing a separator for an electrochemical device as defined in the ninth embodiment, wherein $G_1'$ and $G_1''$ of the first polyvinylidene fluoride copolymer undergo a reverse transition in a region of frequency of 0.5 Hz or less under the condition of a solution containing the first polyvinylidene fluoride copolymer at a solid content of 5 wt % in a solvent including N-methyl pyrrolidone and water mixed at a weight ratio of 90:10.

According to the eleventh embodiment, there is provided the method for manufacturing a separator for an electrochemical device as defined in the ninth or the tenth embodiments, wherein the solvent includes at least one of acetone, tetrahydrofuran, methylene chloride, chloroform, dimethyl formamide, N-methyl-2-pyrrolidone (NMP), cyclohexane, trimethyl phosphate and triethyl phosphate, or a mixture of two or more of them.

According to the twelfth embodiment, there is provided the method for manufacturing a separator for an electrochemical device as defined in any one of the ninth to the eleventh embodiments, wherein the non-solvent includes any one of water, methanol, ethanol, propyl alcohol, butyl alcohol, butanediol, ethylene glycol, propylene glycol and tripropylene glycol, or a mixture of two of more of them.

According to the thirteenth embodiment, there is provided the method for manufacturing a separator for an electrochemical device as defined in any one of the ninth to the twelfth embodiments, wherein the first polyvinylidene fluoride copolymer has a weight average molecular weight of 400,000-1,500,000, and the second polyvinylidene fluoride copolymer has a weight average molecular weight of 50,000-350,000; and the weight ratio of the first polyvinylidene fluoride copolymer to the second polyvinylidene fluoride copolymer is 90:10-40:60.

According to the fourteenth embodiment, there is provided the method for manufacturing a separator for an electrochemical device as defined in any one of the ninth to the thirteenth embodiments, wherein each of the first polyvinylidene fluoride copolymer and the second polyvinylidene fluoride copolymer independently includes a vinylidene fluoride-derived repeating unit; and at least one additional repeating unit derived from hexafluoropropylene, trichloroethylene, trifluoroethylene, tetrachloroethylene, tetrafluoroethylene or chlorotrifluoroethylene.

According to the fifteenth embodiment, there is provided the method for manufacturing a separator for an electrochemical device as defined in the fourteenth embodiment, wherein the weight average molecular weight of the additional repeating unit of the second polyvinylidene fluoride copolymer is equal to or smaller than the weight average molecular weight of the additional repeating unit of the first polyvinylidene fluoride copolymer.

According to the sixteenth embodiment, there is provided the method for manufacturing a separator for an electrochemical device as defined in the fourteenth embodiment, wherein the weight ratio of the vinylidene fluoride-derived repeating unit to the additional repeating unit in the first polyvinylidene fluoride copolymer is 99:1-90:10, and the weight ratio of the vinylidene fluoride-derived repeating unit to the additional repeating unit in the second polyvinylidene fluoride copolymer is 89:11-70:30.

In still another aspect of the present disclosure, there is also provided an electrochemical device according to the following embodiment.

According to the seventeenth embodiment, there is provided an electrochemical device including a cathode, an anode and a separator interposed between the cathode and the anode, wherein the separator is the separator for an electrochemical device as defined in any one of the first to the eighth embodiments.

Advantageous Effects

According to an embodiment of the present disclosure, it is possible to provide a separator for an electrochemical device, which has excellent adhesion between a porous polymer substrate and a porous coating layer and shows excellent adhesion to an electrode, by incorporating polyvinylidene fluoride copolymers having different physical properties to the porous coating layer, as well as an electrochemical device including the separator.

According to an embodiment of the present disclosure, it is possible to provide a separator for an electrochemical device, which has excellent adhesion between a porous polymer substrate and a porous coating layer and shows excellent adhesion to an electrode, by controlling physical properties derived from the phase separation kinetics of the binder polymer contained in the porous coating layer, as well as an electrochemical device including the separator.

According to an embodiment of the present disclosure, it is possible to provide a separator for an electrochemical device, which has improved safety, by using a porous coating layer having a high oxidation potential on a positive electrode, as well as an electrochemical device including the separator.

According to an embodiment of the present disclosure, it is possible to provide a separator having a low alternating current (AC) resistance value and an electrochemical device including the separator.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected electrically to another portion' by way of the other element interposed between them.

Throughout the specification, the expression 'a part [includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination(s) thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect of the present disclosure, there are provided a separator for an electrochemical device, a method for manufacturing the same and an electrochemical device including the same.

In an electrochemical device, such as a lithium secondary battery, there has been a problem in that a separator undergoes a heat shrinking phenomenon at high temperature to cause a short-circuit between a positive electrode and a negative electrode.

To prevent such heat shrinking, the conventional separators are provided with a porous coating layer including inorganic particles and a binder polymer. The porous coating layer is formed by using a difference in phase separation kinetics which varies depending on selection of a solvent/non-solvent to the binder polymer.

However, when the binder polymer shows a high phase separation kinetic rate, it is positioned mainly on the surface of the porous coating layer, and thus pores having a large diameter are formed largely on the surface of the porous coating layer, resulting in degradation of adhesion between the porous polymer substrate and the porous coating layer. On the contrary, when the binder polymer shows a low phase separation kinetic rate, it is positioned mainly at the interface between the porous polymer substrate and the porous coating layer, and thus there are problems in that adhesion between an electrode and the separator is degraded, pores cannot be formed, or the pores formed in this case have a small size, thereby making ion permeation difficult.

To solve the above-mentioned problems, according to an embodiment of the present disclosure, there is provided a separator having a porous coating layer including two types of polyvinylidene fluoride copolymers having different phase separation kinetics.

According to an embodiment of the present disclosure, there is provided a separator for an electrochemical device, including a porous polymer substrate, and a porous coating layer formed on at least one surface of the porous polymer substrate, wherein the porous coating layer includes inorganic particles, a first polyvinylidene fluoride copolymer and a second polyvinylidene fluoride copolymer, $G_1'$ (storage modulus) and $G_1''$ (loss modulus) of the first polyvinylidene fluoride copolymer undergo a reverse transition, and $G_2'$ (storage modulus) and $G_2''$ (loss modulus) of the second polyvinylidene fluoride copolymer undergo no reverse transition.

As used herein, G' is storage modulus, means restorative elasticity of a given material and represents property of a solid. Particularly, G' is the direct result of frequency sweep measurement using a rheometer and means reversible elasticity of a sample under periodic stress.

As used herein, G" is loss modulus, means permanently lost elasticity of a given material and represents property of a liquid. Particularly, G" is a response of phase transfer up to 90° and corresponds to mechanical energy converted into heat and lost irreversibly.

Herein, G' and G" may be determined by using a rheometer (ARES available from TA Instrument).

As used herein, 'reverse transition' refers to a case wherein G' passes over the value of G" in a region of frequency of 0.5 Hz or less under a reverse transition condition.

According to an embodiment of the present disclosure, the reverse transition condition may be the condition of a solution containing the first polyvinylidene fluoride copolymer at a solid content of 5 wt % in a solvent including N-methyl pyrrolidone and water mixed at a weight ratio of 90:10.

According to the present disclosure, the first polyvinylidene fluoride copolymer is a binder polymer which shows a high phase separation kinetic rate so that it may be distributed mainly on the surface of a porous coating layer, when phase separation occurs after it is coated on a porous polymer substrate. The first polyvinylidene fluoride copolymer is positioned on the surface of the porous coating layer to form pores having a large diameter on the surface of the porous polymer substrate, thereby reducing the resistance on the surface of the porous coating layer. It is advisable that the first polyvinylidene fluoride copolymer has a higher phase separation kinetic rate, which can be determined from a reverse transition between $G_1'$ and $G_1''$ under a predetermined condition. In other words, when a reverse transition occurs between $G_1'$ and $G_1''$ of the first polyvinylidene fluoride copolymer under a predetermined condition, the binder polymer undergoes phase separation and is solidified, and thus it can be inferred that the first polyvinylidene fluoride copolymer has a high phase separation kinetic rate.

According to the present disclosure, the second polyvinylidene fluoride copolymer is a binder polymer which shows a low phase separation kinetic rate so that it may be distributed mainly at the interface between the porous polymer substrate and the porous coating layer, when phase separation occurs after it is coated on a porous polymer substrate. Particularly, the second polyvinylidene fluoride copolymer having a low phase separation kinetic rate is distributed mainly between the porous polymer substrate and the porous coating layer due to a small pore diameter or absence of pores, and thus can increase the adhesion between the porous polymer substrate and the porous coating layer. Herein, such a low phase separation kinetic rate of the second polyvinylidene fluoride copolymer can be determined from the fact that no phase transition occurs between $G_2'$ and $G_2''$ under a predetermined condition. In other words, when no reverse transition occurs between $G_2'$ and $G_2''$ of the second polyvinylidene fluoride copolymer under a predetermined condition, it can be inferred that the second polyvinylidene fluoride copolymer has a low phase separation kinetic rate.

According to the present disclosure, the phase separation kinetic rate may be determined by the following method:

A polymer solution dissolved at 5 wt % in a solvent is prepared in a transparent vial. When dissolution is made well, the polymer solution seems clear. While mixing the polymer solution, a non-solvent is titrated at a predetermined rate and the cloud point of the polymer solution is measured. Herein, the phase separation kinetic rate can be predicted from the amount of non-solvent introduced by the time of cloud point. The solvent and non-solvent are not particularly limited. However, when using a polyvinylidene copolymer as a binder, typical examples of the solvent that may be used include N-methyl-2-pyrrolidone and those of the non-solvent that may be used include water.

Therefore, according to the present disclosure, a high phase separation kinetic rate means that the cloud point of the polymer solution appears early after introducing the non-solvent. In addition, a low phase separation kinetic rate means that the cloud point of the polymer solution appears late or no cloud point appears.

According to an embodiment of the present disclosure, the first polyvinylidene fluoride copolymer may have a larger weight average molecular weight as compared to the second polyvinylidene fluoride copolymer.

Particularly, the first polyvinylidene fluoride copolymer may have a weight average molecular weight of 400,000-1,500,000, 500,000-1,200,000, or 600,000-1,000,000, and the second polyvinylidene fluoride copolymer may have a weight average molecular weight of 50,000-350,000, 100,000-300,000, or 150,000-280,000.

When the weight average molecular weight of the first polyvinylidene fluoride copolymer and that of the second polyvinylidene fluoride copolymer are within the above-defined range, the first polyvinylidene fluoride copolymer has a high phase separation kinetic rate and is distributed mainly on the surface of the porous coating layer, and the second polyvinylidene fluoride copolymer has a low phase separation kinetic rate and is positioned mainly at the interface between the porous polymer substrate and the porous coating layer. Therefore, it is possible to provide a separator having excellent adhesion between the porous polymer substrate and the porous coating layer and excellent adhesion between an electrode and the separator. In other words, when the second polyvinylidene fluoride copolymer has a smaller weight average molecular weight as compared to the first polyvinylidene fluoride copolymer, the first polyvinylidene fluoride copolymer has a higher phase separation kinetic rate as compared to the second polyvinylidene fluoride copolymer, and thus it is possible to provide a separator having a low resistance value on the porous coating layer surface and improved adhesion between the porous polymer substrate and the porous coating layer.

Herein, the weight ratio of the first polyvinylidene fluoride copolymer to the second polyvinylidene fluoride copolymer may be 90:10-40:60, 80:20-45:55, or 75:25-50:50. Within the above-defined range, it is possible to provide a separator having a low resistance value on the porous coating layer surface and improved adhesion between the porous polymer substrate and the porous coating layer. It is also possible to improve the adhesion between the separator and an electrode.

According to an embodiment of the present disclosure, each of the first polyvinylidene fluoride copolymer and the second polyvinylidene fluoride copolymer independently may include a vinylidene fluoride-derived repeating unit; and at least one additional repeating unit derived from hexafluoropropylene, trichloroethylene, trifluoroethylene, tetrachloroethylene, tetrafluoroethylene or chlorotrifluoroethylene.

According an embodiment of the present disclosure, the additional repeating unit of the first polyvinylidene fluoride copolymer may be the same as or different from that of the second polyvinylidene fluoride copolymer.

Herein, the weight average molecular weight of the additional repeating unit of the second polyvinylidene fluoride copolymer may be equal to or smaller than the weight average molecular weight of the additional repeating unit of the first polyvinylidene fluoride copolymer. When the additional repeating unit of the second polyvinylidene fluoride copolymer has a larger size, non-solvent may approach the copolymer more easily, resulting in a higher phase separation kinetic rate. Therefore, when the weight average molecular weight of the additional repeating unit of the first polyvinylidene fluoride copolymer is larger than the weight average molecular weight of the additional repeating unit of the second polyvinylidene fluoride copolymer, the first polyvinylidene fluoride copolymer has a higher phase separation kinetic rate and is positioned mainly on the surface of the porous coating layer to reduce the resistance, while the second polyvinylidene fluoride copolymer is positioned between the porous coating layer and the porous polymer substrate to improve the adhesion between the porous polymer substrate and the porous coating layer.

Meanwhile, the first polyvinylidene fluoride copolymer and the second polyvinylidene fluoride copolymer may have a different substitution degree.

According to an embodiment of the present disclosure, the weight ratio of the vinylidene fluoride-derived repeating unit to the additional repeating unit in the first polyvinylidene fluoride copolymer is 99:1-90:10, 99:1-91:9, or 99:1-92:8, and the weight ratio of the vinylidene fluoride-derived repeating unit to the additional repeating unit in the second polyvinylidene fluoride copolymer is 89:11-70:30, 88:12-70:30, or 86:14-75:25. When the first polyvinylidene fluoride copolymer and the second polyvinylidene fluoride copolymer have the above-defined weight ratio of repeating units, the first polyvinylidene fluoride copolymer has a high phase separation kinetic rate and is distributed mainly on the surface of the porous coating layer, while the second polyvinylidene fluoride copolymer has a low phase separation kinetic rate and is positioned mainly at the interface between the porous polymer substrate and the porous coating layer. Therefore, it is possible to provide a separator having excellent adhesion between the porous polymer substrate and the porous coating layer, and excellent adhesion between an electrode and the separator.

When the first polyvinylidene fluoride copolymer is used alone, it is difficult to ensure the adhesion between the porous polymer substrate and the porous coating layer through phase separation. Particularly, when using an immersion phase separation process including substitution of the total solvent of the coating layer with a non-solvent upon phase separation, it becomes more difficult to ensure the adhesion. On the contrary, when the second polyvinylidene fluoride copolymer is used alone, phase separation does not occur rapidly, and it is difficult to realize adhesion to an external electrode on the porous coating layer surface.

According to an embodiment of the present disclosure, the first polyvinylidene fluoride copolymer, which is distributed mainly on the coating layer surface and is in contact with an electrode, may have an oxidation potential of 5.0V or higher, particularly 6.5-8.5V, based on Li.

According to an embodiment of the present disclosure, the inorganic particles are not particularly limited, as long as they are electrochemically stable. In other words, the inorganic particles are not particularly limited, as long as they cause no oxidation and/or reduction in the operating voltage range (e.g. 0-5V based on Li/Li$^+$) of an applicable electrochemical device. Particularly, when using inorganic particles having a high dielectric constant, they contribute to an increase in dissociation degree of the electrolyte salt, particularly lithium salt, in a liquid electrolyte, and thus can improve ion conductivity of the electrolyte.

For these reasons, the inorganic particles may include inorganic particles having a dielectric constant of 5 or more, inorganic particles capable of transporting lithium ions or a mixture thereof.

The inorganic particles having a dielectric constant of 5 or more may include at least one selected from the group consisting of $Al_2O_3$, $SiO_2$, $ZrO_2$, $ALO(OH)$, $TiO_2$, $BaTiO_3$, $Pb(Zr_xTi_{1-x})O_3$ (PZT, wherein $0<x<1$), $Pb_{1-x}La_xZr_{1-y}Ti_yO_3$ (PLZT, wherein $0<x<1$, $0<y<1$), $(1-x)Pb(Mg_{1/3}Nb_{2/3})O_3$-$xPbTiO_3$ (PMN-PT, wherein $0<x<1$), hafnia ($HfO_2$), $SrTiO_3$, $SnO_2$, $CeO_2$, MgO, NiO, CaO, ZnO, $ZO_3$, SiC and combinations thereof.

Particular examples of the inorganic particles capable of transporting lithium ions include at least one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$), $P_2S_5$-based glass ($Li_xP_yS_z$, $0<x<3$, $0<y<3$, $0<z<7$), and combinations thereof.

There is no particular limitation in diameter of the inorganic particles. However, the inorganic particles preferably have an average particle diameter of 0.001-10 µm with a view to formation of a porous coating layer having a uniform thickness and adequate porosity. Preferably, the inorganic particles may have a diameter of 100-700 nm, and more preferably 150-600 nm.

According to an embodiment of the present disclosure, the weight ratio between the inorganic particles and the binder polymer is 50:50-80:20, particularly 60:40-70:30. When the weight ratio of the total inorganic particles based on the binder polymer satisfies the above-defined range, it is possible to prevent the problem of degradation of pore size and porosity of a coating layer caused by an increased amount of binder polymer. It is also possible to solve the problem of weakening of peeling resistance of a coating layer caused by an insufficient amount of binder polymer.

According to an embodiment of the present disclosure, the porous coating layer may further include other additives as ingredients thereof, besides the above-mentioned inorganic particles and binder polymer.

Although there is no particular limitation in the thickness of the porous coating layer, the porous coating layer formed on one surface of the porous polymer substrate may have a thickness of 1-10 µm, particularly 1.5-6 µm. When the porous coating layers are formed on both surfaces of the porous polymer substrate, the total thickness of the porous coating layers may be 2-20 µm, particularly 3-12 µm.

Also, there is no particular limitation in the porosity of the porous coating layer, the porous coating layer may have a porosity of 35-65%.

In the separator according to an embodiment of the present disclosure, the porous polymer substrate may be a porous polymer film substrate or porous polymer non-woven web substrate.

The porous polymer film substrate may include a porous polymer film including a polyolefin, such as polyethylene or polypropylene. For example, such a polyolefin porous polymer film substrate realizes a shut-down function at a temperature of 80-130° C.

Herein, the polyolefin porous polymer film may include a polymer formed of polyethylene, such as high-density polyethylene, linear low-density polyethylene, low-density polyethylene and ultrahigh-molecular weight polyethylene, polypropylene, polybutylene and polypentene alone or in combination.

In addition, the porous polymer film substrate may be prepared by using various polymers, such as polyesters, in addition to polyolefins and forming the polymers into a film shape. The porous polymer film substrate may be formed to have a stacked structure of two or more film layers, wherein each film layer may include the above-mentioned polymers, such as polyolefins and polyesters, alone or in combination.

In addition to the above-mentioned polyolefins, the porous polymer film substrate and the porous polymer non-woven web substrate may include polyester, such as polyethylene terephthalate, polybutylene terephthalate or polyethylene naphthalene, polyacetal, polyamide, polycarbonate, polyimide, polyether ether ketone, polyether sulfone, polyphenylene oxide, polyphenylene sulfide, or the like, alone or in combination.

Although there is no particular limitation in thickness of the porous polymer substrate, the porous polymer substrate may have a thickness of 1-100 μm, particularly 5-50 μm. Although the pore size and porosity of the pores present in the porous polymer substrate are not also limited particularly, it is preferred that the pore size and porosity are 0.01-50 μm and 10-95%, respectively.

In another aspect of the present disclosure, there is provided a method for manufacturing the separator.

First, slurry containing a solvent, inorganic particles, the first polyvinylidene fluoride copolymer and the second polyvinylidene fluoride copolymer is prepared (S1).

Particularly, the first polyvinylidene fluoride copolymer and the second polyvinylidene fluoride copolymer may be dissolved in the solvent, and then the inorganic particles may be added to and dispersed in the resultant solution to prepare slurry.

Otherwise, the first polyvinylidene fluoride copolymer, the second polyvinylidene fluoride copolymer and the inorganic particles may be introduced to the solvent at once and mixed to prepare slurry.

The first polyvinylidene fluoride copolymer, the second polyvinylidene fluoride copolymer and the inorganic particles are the same as described above.

Next, the slurry is applied to at least one surface of a porous polymer substrate (S2).

The slurry may be applied by using a slot coating process or dip coating process, but is not limited thereto. A slot coating process includes coating a composition supplied through a slot die onto the whole surface of a substrate and is capable of controlling the thickness of a coating layer depending on the flux supplied from a metering pump. In addition, dip coating includes dipping a substrate into a tank containing a composition to carry out coating and is capable of controlling the thickness of a coating layer depending on the concentration of the composition and the rate of removing the substrate from the composition tank. Further, in order to control the coating thickness more precisely, it is possible to carry out post-metering through a Mayer bar or the like, after dipping.

Then, the resultant product of (S2) is dipped in a non-solvent for a predetermined time to carry out phase separation (S3).

In this manner, the polyvinylidene fluoride copolymers are solidified while phase separation occurs in the coated slurry. During this step, pores are formed in the porous coating layer including the first polyvinylidene fluoride copolymer, the second polyvinylidene fluoride copolymer and inorganic particles.

After that, the resultant product of (S3) is washed with water to remove foreign materials and then dried to form a porous coating layer on at least one surface of the porous polymer substrate.

The solvent for dissolving the first polyvinylidene fluoride copolymer and the second polyvinylidene fluoride copolymer is a good solvent.

As used herein, 'solvent' is defined as one that is used for dissolving the first polyvinylidene fluoride copolymer therein at a solid content of 5 wt % to prepare a polymer solution and shows G' smaller than G" in a region of frequency of 0.5 Hz or less, when the polymer solution is determined for rheological properties.

As used herein, 'non-solvent' is defined as one that is added to a polymer solution, prepared by dissolving the second polyvinylidene fluoride copolymer in N-methyl pyrrolidone known as the most suitable solvent at a solid content of 5 wt %, subsequently at a weight ratio of 15 pt and shows G' larger than G" in a region of frequency of 0.5 Hz or less, when the polymer solution is determined for rheological properties.

According to an embodiment of the present disclosure, the solvent may include acetone, tetrahydrofuran, methylene chloride, chloroform, dimethylformamide, N-methyl-2-pyrrolidone (NMP), cyclohexane, trimethyl phosphate or triethyl phosphate, or a mixture of two or more of them.

According to an embodiment of the present disclosure, the non-solvent may include water, methanol, ethanol, butyl alcohol, butanediol, ethylene glycol, propylene glycol or tripropylene glycol, or a mixture of two or more of them. Particularly, water is preferred as a non-solvent.

According to an embodiment of the present disclosure, the dipping is controlled preferably within 2 minutes. When the dipping time is larger than 2 minutes, phase separation occurs excessively to cause degradation of the adhesion between the porous polymer substrate and the porous coating layer, resulting in separation of the porous coating layer.

In the porous coating layers, the inorganic particles are bound among themselves by the binder while they are packed and are in contact with each other. Thus, interstitial volumes are formed among the inorganic particles and the interstitial volumes become vacant spaces to form pores.

In other words, the binder attaches the inorganic particles to each other so that they may retain their binding states. For example, the binder polymer connects and fixes the inorganic particles with each other. In addition, the pores of the porous coating layer are those formed by the interstitial volumes among the inorganic particles which become vacant spaces. The space is defined by the inorganic particles facing each other substantially in a closely packed or densely packed structure of the inorganic particles.

The electrochemical device according to another aspect of the present disclosure includes a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors such as super capacitor devices. Particularly, among the secondary batteries, lithium secondary batteries, including lithium metal secondary batteries, lithium ion secondary batteries, lithium polymer secondary batteries or lithium ion polymer ion batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (g-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Manufacture of Separator

At 60° C., alumina (LS235, Japan Light Metal, LS235) as inorganic particles, the first polyvinylidene fluoride copolymer (Arkema, Kynar2801, reverse phase transition generated) having a weight average molecular weight of 600,000 and a weight ratio of vinylidene fluoride-derived repeating units to hexafluoropropylene-derived repeating units of 93:7, the second polyvinylidene fluoride copolymer (Solvay, Solef21510, no reverse phase transition generated) having a weight average molecular weight of 270,000 and a weight ratio of vinylidene fluoride-derived repeating units to hexafluoropropylene-derived repeating units of 85:15 were dispersed in N-methyl-2-pyrrolidone (NMP) as a solvent at a weight ratio of 65:25:10 to prepare slurry for forming a porous coating layer. Herein, the amount of inorganic particles added to the slurry was 500 g, and the inorganic particles were added in an amount of 20 parts by weight based on 100 parts by weight of the solvent. In addition, the weight ratio of the first polyvinylidene fluoride copolymer to the second polyvinylidene fluoride copolymer was 72:28, and the first polyvinylidene fluoride copolymer had an oxidation potential of 8.16V based on Li.

Then, the slurry for forming a porous coating layer was applied to both surfaces of a polyethylene porous polymer substrate having a thickness of 9 μm through a dip coating process. After that, the polyethylene porous polymer substrate coated with the slurry was dipped in water as a non-solvent for 40 seconds and then dried to obtain a separator having a porous coating layer. Each of the porous coating layers formed on both surfaces of the polyethylene porous polymer substrate had a thickness of 3 μm.

(2) Manufacture of Cathode

A cathode active material ($LiCoO_2$), a conductive material (carbon black) and a binder polymer (polyvinylidene fluoride) were introduced to N-methyl-2-pyrrolidone (NMP) at a weight ratio of 96:1.5:2.5, followed by mixing, to prepare slurry. The resultant slurry was coated onto aluminum foil having a thickness of 30 μm to a capacity of 3.285 $mAh/cm^2$ to obtain a cathode.

(3) Manufacture of Anode

An anode active material (graphite), a conductive material (carbon black), carboxymethyl cellulose (CMC) and a binder polymer (styrene butadiene rubber, SBR) were mixed with water at a weight ratio of 95:2.5:1.5:1 to prepare slurry. The slurry was coated onto copper foil having a thickness of 8 μm to obtain an anode having a porosity of 28% and a thickness of 50 μm.

(4) Manufacture of Lithium Secondary Battery

First, $LiPF_6$ was dissolved in an organic solvent containing ethylene carbonate (EC) and ethylmethyl carbonate (EMC) mixed at a ratio of 3:7 (volume ratio) to a concentration of 1.0 M to prepare a non-aqueous electrolyte.

Then, the separator was interposed between the cathode and the anode obtained as described above and pressing was carried out at 90° C. under 8.5 MPa for 1 second to form an electrode assembly. The electrode assembly was received in a pouch casing and the electrolyte was injected thereto to obtain a lithium secondary battery.

Example 2

A separator was obtained in the same manner as Example 1, except that polyvinylidene fluoride copolymer (Arkema, Kynar2500) having a weight average molecular weight of 230,000 and a weight ratio of vinylidene fluoride-derived repeating units to hexafluoropropylene-derived repeating units of 82:18 was used as the second polyvinylidene fluoride copolymer, instead of the second polyvinylidene fluoride copolymer (Solvay, Solef21510, no reverse phase transition generated) used in Example 1. In addition, a lithium secondary battery was obtained in the same manner as Example 1 by using the separator.

Example 3

A separator was obtained in the same manner as Example 1, except that polyvinylidene fluoride copolymer (Sigma Aldrich, Solvene200, no phase transition generated) having a weight average molecular weight of 250,000 and a weight ratio of vinylidene fluoride-derived repeating units to hexafluoropropylene-derived repeating units of 80:20 was used as the second polyvinylidene fluoride copolymer, instead of the second polyvinylidene fluoride copolymer (Solvay, Solef21510, no reverse phase transition generated) used in Example 1. In addition, a lithium secondary battery was obtained in the same manner as Example 1 by using the separator.

Comparative Example 1

A separator was obtained in the same manner as Example 1, except that polyvinylidene fluoride copolymer (Arkema, Kynar2751, reverse phase transition generated) having a weight average molecular weight of 450,000 and a weight ratio of vinylidene fluoride-derived repeating units to hexafluoropropylene-derived repeating units of 87:13 was used as the second polyvinylidene fluoride copolymer, instead of the second polyvinylidene fluoride copolymer (Solvay, Solef21510, no reverse phase transition generated) used in Example 1. In addition, a lithium secondary battery was obtained in the same manner as Example 1 by using the separator.

Comparative Example 2

A separator was obtained in the same manner as Example 1, except that the first polyvinylidene fluoride copolymer was not used and the second polyvinylidene fluoride copolymer causing no reverse phase transition was used alone. In addition, a lithium secondary battery was obtained in the same manner as Example 1 by using the separator.

Comparative Example 3

A separator was obtained in the same manner as Example 1, except that the second polyvinylidene fluoride copolymer was not used and the first polyvinylidene fluoride copolymer causing a reverse phase transition was used alone. In addition, a lithium secondary battery was obtained in the same manner as Example 1 by using the separator.

Comparative Example 4

A separator and a lithium secondary battery including the same were obtained in the same manner as Example 1, except that polyvinylidene fluoride copolymer (Arkema, Kynar2821, reverse phase transition generated) having a weight average molecular weight of 320,000 and a weight ratio of vinylidene fluoride-derived repeating units to hexafluoropropylene-derived repeating units of 92:8 was used as the second polyvinylidene fluoride copolymer, instead of the second polyvinylidene fluoride copolymer (Solvay, Solef21510, no reverse phase transition generated) used in Example 1.

Test Examples

1) Determination of Adhesion (Peel Strength) Between Porous Polymer Substrate and Porous Coating Layer Each of the separators according to Examples 1-3 and Comparative Examples 1~4 was cut into a size of 15 mm×100 mm. A double-sided adhesive tape was attached to a glass plate and the porous coating layer surface of the separator was attached to the adhesive tape. Then, the end portion of the separator was mounted to a UTM instrument (LLOYD Instrument LF Plus), and force was applied at 180° and a rate of 300 mm/min. The force required for separating the porous coating layer from the porous polymer substrate was measured.

2) Determination of Adhesion (Lami Strength) Between Separator and Electrode

The anode obtained according to Example 1 was cut into a size of 15 mm×100 mm. Each of the separators according to Examples 1-3 and Comparative Examples 1~4 was cut into a size of 15 mm×100 mm. The separator was stacked with the anode, and the stack was inserted between PET films having a thickness of 100 µm and adhered by using a flat press. Herein, the flat press was heated at 90° C. under a pressure of 8.5 MPa for 1 second. The end portion of the adhered separator and anode was mounted to a UTM instrument (LLOYD Instrument LF Plus), and force was applied at 180° and a rate of 300 mm/min. The force required for separating the anode from the outermost surface (porous coating layer) of the separator facing the anode was measured.

The results of adhesion of each of the separators according to Examples 1-3 and Comparative Examples 1-4 are shown in the following Table 1.

TABLE 1

| | Adhesion between porous polymer substrate and porous coating layer (Peel Strength) (gf/15 mm) | Adhesion between separator and electrode (Lami Strength) (gf/15 mm) |
|---|---|---|
| Example 1 | 81.1 | 75.3 |
| Example 2 | 83.8 | 74.4 |
| Example 3 | 85.9 | 73.8 |
| Comp. Ex. 1 | 12.5 | Not available |
| Comp. Ex. 2 | 98.1 | 33.1 |
| Comp. Ex. 3 | 26.4 | Not available |
| Comp. Ex. 4 | 37.2 | 16.8 |

It can be seen that each of the separators according to Examples 1-3 shows high adhesion between the porous polymer substrate and the porous coating layer balanced with high adhesion between the porous coating layer and the anode. Each of the separators according to Comparative Examples 1 and 3 shows low adhesion between the porous polymer substrate and the porous coating layer and the corresponding interface was peeled during the determination of peel force, and thus peel force to the electrode cannot be determined. Comparative Example 2 has a problem of low peel force between the porous coating layer and the anode. The separator according to Comparative Example 4 shows poor adhesion between the porous polymer substrate and the porous coating layer and poor adhesion between the separator and the electrode, and thus is not suitable for use in a separator for a lithium secondary battery.

3) Determination of Reverse Phase Transition

A reverse phase transition refers to a case wherein G' passes over G" value in a region of frequency of 0.5 Hz or less under the condition of a solution containing the first polyvinylidene fluoride copolymer at a solid content of 5 wt % in a solvent including N-methyl pyrrolidone and water mixed at a weight ratio of 90:10.

The first polyvinylidene fluoride copolymer used in Examples 1-3 undergo a reverse phase transition, and all of the second polyvinylidene fluoride copolymers undergoes no reverse phase transition.

4) Determination of Resistance

Each of the pouch-type lithium secondary batteries according to Examples 1-3 and Comparative Examples 1-4 was determined for alternating current (AC) resistance. The results are shown in the following Table 2. Herein, AC resistance is a value measured at 1 KMz by using Hioki. Resistances of the separators according to Examples 1-3 and Comparative Examples 1-4 can be compared with one another from the AC resistance values of the secondary batteries.

TABLE 2

|  | AC Resistance (Ohm) |
| --- | --- |
| Example 1 | 8.6 |
| Example 2 | 8.7 |
| Example 3 | 8.9 |
| Comp. Ex. 1 | 9.3 |
| Comp. Ex. 2 | 10.1 |
| Comp. Ex. 3 | 9.0 |
| Comp. Ex. 4 | 9.1 |

It can be seen from the above results that Comparative Example 2 using the second polyvinylidene fluoride copolymer alone shows high resistance undesirably. It is thought that this is because when a layer having an excessively high content of binder polymer is formed in the thickness direction of the porous coating layer, lithium ion transport undergoes a bottle-neck phenomenon in the layer to cause an increase in resistance.

On the contrary, according to the present disclosure, two types of polyvinylidene fluoride copolymers having different phase separation characteristics are mixed to form porous coating layers at different positions. As a result, it is possible to maintain a similar level of resistance not only in the interface between the electrode and the porous coating layer but also in the interface between the porous coating layer and the porous polymer substrate, and thus to maintain the overall resistance of the separator to a low level. The lithium secondary battery having such low resistance has an advantage in that it provides significantly improved performance, particularly output.

What is claimed is:

1. A separator for an electrochemical device, comprising:
a porous polymer substrate; and
a porous coating layer formed on at least one surface of the porous polymer substrate,
wherein the porous coating layer comprises inorganic particles, a first polyvinylidene fluoride copolymer and a second polyvinylidene fluoride copolymer,
$G_1'$ (storage modulus) and $G_1''$ (loss modulus) of the first polyvinylidene fluoride copolymer undergo a reverse transition,
$G_2'$ (storage modulus) and $G_2''$ (loss modulus) of the second polyvinylidene fluoride copolymer undergo no reverse transition, and
$G_1'$ and $G_1''$ of the first polyvinylidene fluoride copolymer undergo the reverse transition at a frequency of 0.5 Hz or less under a condition of a solution containing the first polyvinylidene fluoride copolymer at a solid content of 5 wt % in a solvent including N-methyl pyrrolidone and water mixed at a weight ratio of 90:10.

2. The separator according to claim 1, wherein the first polyvinylidene fluoride copolymer has a weight average molecular weight larger than a weight average molecular weight of the second polyvinylidene fluoride copolymer.

3. The separator according to claim 1, wherein the first polyvinylidene fluoride copolymer has a weight average molecular weight of 400,000-1,500,000, and the second polyvinylidene fluoride copolymer has a weight average molecular weight of 50,000-350,000; and
a weight ratio of the first polyvinylidene fluoride copolymer to the second polyvinylidene fluoride copolymer is 90:10-40:60.

4. The separator according to claim 1, wherein each of the first polyvinylidene fluoride copolymer and the second polyvinylidene fluoride copolymer independently comprises a vinylidene fluoride-derived repeating unit; and at least one additional repeating unit derived from hexafluoropropylene, trichloroethylene, trifluoroethylene, tetrachloroethylene, tetrafluoroethylene or chlorotrifluoroethylene.

5. The separator according to claim 4, wherein the weight average molecular weight of the additional repeating unit of the second polyvinylidene fluoride copolymer is equal to or smaller than the weight average molecular weight of the additional repeating unit of the first polyvinylidene fluoride copolymer.

6. The separator according to claim 4, wherein a weight ratio of the vinylidene fluoride-derived repeating unit to the additional repeating unit in the first polyvinylidene fluoride copolymer is 99:1-90:10, and
a weight ratio of the vinylidene fluoride-derived repeating unit to the additional repeating unit in the second polyvinylidene fluoride copolymer is 89:11-70:30.

7. The separator according to claim 1, wherein the first polyvinylidene fluoride copolymer has an oxidation potential of 5.0V or higher relative to lithium.

8. A method for manufacturing a separator for an electrochemical device, comprising:
(S1) preparing a slurry containing a solvent, inorganic particles, a first polyvinylidene fluoride copolymer and a second polyvinylidene fluoride copolymer;
(S2) applying the slurry onto at least one surface of a porous polymer substrate;
(S3) dipping a product of (S2) in a non-solvent to cause phase separation; and
(S4) drying a product of (S3) to form a porous coating layer on the at least one surface of the porous polymer substrate,
wherein the porous coating layer comprises the inorganic particles, the first polyvinylidene fluoride copolymer and the second polyvinylidene fluoride copolymer,
$G_1'$ (storage modulus) and $G_1''$ (loss modulus) of the first polyvinylidene fluoride copolymer undergo a reverse transition, and
$G_2'$ (storage modulus) and $G_2''$ (loss modulus) of the second polyvinylidene fluoride copolymer undergo no reverse transition, and
$G_1'$ and $G_1''$ of the first polyvinylidene fluoride copolymer undergo the reverse transition at a frequency of 0.5 Hz or less under the condition of a solution containing the first polyvinylidene fluoride copolymer at a solid content of 5 wt % in a solvent including N-methyl pyrrolidone and water mixed at a weight ratio of 90:10.

9. The method according to claim 8, wherein the solvent comprises at least one of acetone, tetrahydrofuran, methylene chloride, chloroform, dimethyl formamide, N-methyl-2-pyrrolidone (NMP), cyclohexane, trimethyl phosphate or triethyl phosphate.

10. The method according to claim 8, wherein the non-solvent comprises at least one of water, methanol, ethanol, propyl alcohol, butyl alcohol, butanediol, ethylene glycol, propylene glycol or tripropylene glycol.

11. The method according to claim 8, wherein the first polyvinylidene fluoride copolymer has a weight average molecular weight of 400,000-1,500,000, and the second polyvinylidene fluoride copolymer has a weight average molecular weight of 50,000-350,000; and a weight ratio of the first polyvinylidene fluoride copolymer to the second polyvinylidene fluoride copolymer is 90:10-40:60.

12. The method according to claim 8, wherein each of the first polyvinylidene fluoride copolymer and the second polyvinylidene fluoride copolymer independently comprises a vinylidene fluoride-derived repeating unit; and at least one additional repeating unit derived from hexafluoropropylene, trichloroethylene, trifluoroethylene, tetrachloroethylene, tetrafluoroethylene or chlorotrifluoroethylene.

13. The method according to claim 12, wherein a weight average molecular weight of the additional repeating unit of the second polyvinylidene fluoride copolymer is equal to or smaller than a weight average molecular weight of the additional repeating unit of the first polyvinylidene fluoride copolymer.

14. The method according to claim 12, wherein a weight ratio of the vinylidene fluoride-derived repeating unit to the additional repeating unit in the first polyvinylidene fluoride copolymer is 99:1-90:10, and a weight ratio of the vinylidene fluoride-derived repeating unit to the additional repeating unit in the second polyvinylidene fluoride copolymer is 89:11-70:30.

15. An electrochemical device comprising a cathode, an anode and a separator interposed between the cathode and the anode, wherein the separator is as defined in claim 1.

* * * * *